(12) United States Patent
Larsson et al.

(10) Patent No.: US 7,710,908 B2
(45) Date of Patent: May 4, 2010

(54) METHOD AND ARRANGEMENT FOR CODING AND SCHEDULING IN A RETRANSMISSION COMMUNICATION SYSTEM

(75) Inventors: Peter Larsson, Solna (SE); Niklas Johan Johansson, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 11/994,942

(22) PCT Filed: May 5, 2006

(86) PCT No.: PCT/SE2006/050109

§ 371 (c)(1),
(2), (4) Date: Jul. 22, 2008

(87) PCT Pub. No.: WO2007/008163

PCT Pub. Date: Jan. 18, 2007

(65) Prior Publication Data

US 2008/0310409 A1    Dec. 18, 2008

(30) Foreign Application Priority Data

Jul. 7, 2005    (WO) ............... PCT/SE2005/001144

(51) Int. Cl.
*H04H 20/71* (2008.01)

(52) U.S. Cl. ................ 370/312; 370/395.4; 370/474; 714/748

(58) Field of Classification Search ............ None
See application file for complete search history.

(56) References Cited

U.S. PATENT DOCUMENTS 5,727,002 A * 3/1998 Miller et al. ............... 714/748

(Continued)

FOREIGN PATENT DOCUMENTS

WO    WO/2007/008123    1/2007

OTHER PUBLICATIONS

WO 2006/085801. Johansson et al. Quality-based data scheduling. Aug. 17, 2006.*

(Continued)

*Primary Examiner*—Salman Ahmed
*Assistant Examiner*—Peter Chau
(74) *Attorney, Agent, or Firm*—Roger S. Burleigh

(57) ABSTRACT

A sending node (405) is adapted for communication with several receiving nodes (410, 420) by transmitting information in the form of a regular data packet to at least one intended receiving nodes, said sending node comprising— means to receive, identify and store a priori information in feedback from receiving nodes (410, 420); —means (905) for forming a composite data packet from at least two regular data packets, said means arranged to use a priori information from said a priori information storage module (910) and to determine which multiple individual data packets to retrieve from a buffer module (920) for use in the composite data packet, said means being arranged to form a composite data packet from which the intended receiving node for each of the at least two regular packets can decode the composite packet to obtain at least one packet intended for it.

31 Claims, 9 Drawing Sheets

U.S. PATENT DOCUMENTS

| | | | |
|---|---|---|---|
| 6,278,716 B1* | 8/2001 | Rubenstein et al. | 370/432 |
| 6,453,372 B1* | 9/2002 | Mizunuma et al. | 710/52 |
| 7,536,622 B2* | 5/2009 | Leon et al. | 714/748 |
| 2002/0065064 A1* | 5/2002 | Griffith et al. | 455/405 |
| 2002/0146016 A1* | 10/2002 | Liu et al. | 370/401 |
| 2006/0013257 A1* | 1/2006 | Vayanos | 370/473 |
| 2006/0048036 A1* | 3/2006 | Miura et al. | 714/758 |
| 2008/0198785 A1* | 8/2008 | Huang et al. | 370/312 |

OTHER PUBLICATIONS

Shen Yong; "XOR Retransmission in Multicast Error Recovery" 2000 IEEE part "3Xoe mechanism", "4.Algorithm of building a hypo-optimum matrix X".

* cited by examiner

METHOD AND ARRANGEMENT FOR CODING AND SCHEDULING IN A RETRANSMISSION COMMUNICATION SYSTEM

FIELD OF INVENTION

The present invention relates to a communication system with at least one sending node in communication with a plurality of receiving nodes, wherein the media has unreliable and potentially fluctuating characteristics. In particular, the method and arrangement according to the present invention relates to the method and use of scheduling in systems utilizing automatic repeat request (ARQ).

BACKGROUND OF THE INVENTION

Wireless communication systems are currently undergoing a shift in technology, from the circuit switched technology in second generation systems like GSM to packet data switched systems in third generation and future communication systems. The change of technology is driven by the increasing demands on services other than voice communication, such as multimedia services and web browsing combined with requirements on efficient use of the scarce radio recourses and increased flexibility. The packet data based communication technology exhibits vast possible improvements compared to circuit switch technology with regards to flexibility, possible throughput (bit rate) and the possibility to adapt to changing radio environment.

One problem in packet based systems is that some packets may not be received by their intended recipients. This is generally solved by different types of retransmission procedures. To make retransmission procedures efficient, each receiver usually informs the sending unit about the packets it has received, for example, through acknowledgement messages. Packets that are not received by the intended recipient can be retransmitted. Such retransmission procedure is often denoted Automatic repeat request (ARQ)

ARQ may be beneficial in any communication systems, but is normally deemed vital for data communication over the air interface in cellular wireless communication systems. This is also true for multihop systems, also known as mesh network oriented systems, and in ad hoc oriented systems. The data is, prior to the transmission, typically divided into smaller packets, protocol data units (PDU). A reliable transfer is enabled by encoding packets with an error detecting code, such that the receiver can detect erroneous or lost packets and thereby request a retransmission. The data sequence integrity is normally accomplished by sequential numbering of packets and applying certain transmission rules.

In the most simple form of ARQ, commonly referred to as Stop-and-Wait ARQ, the sender of data stores each sent data packet and waits for an acknowledgement from the receiver of a correctly received data packet, by the way of a acknowledgement message (ACK). When the ACK is received, the sender discards the stored packet and sends the next packet. The process is typically supplemented with timers and the use of negative acknowledgement messages (NACK). The sending entity uses a timer, which is started on the transmission of a data packet, and if no ACK (or NACK) has been received before the timer expires, the data packet is retransmitted. If the receiver detects errors in the packet, it can send a NACK to sender. Upon receiving the NACK, the sender retransmits the data packet without waiting for the timer to expire. If the ACK or NACK message is lost, the timer will eventually expire and the sender will retransmit the data packet.

Some packets are received by other recipients than the intended recipient. Traditionally these packets have just been discarded as useless information.

Co-pending application PCT/SE2005/001144 discloses an improved scheduling and coding method and arrangement exploiting the fact that information is received by other nodes in the system than the initially designated receiving node. The method is suitable in communication systems utilizing automatic repeat request (ARQ) or multihop scheduling and forwarding, wherein the media is unreliable, is needed.

This co-pending application proposes a method and an arrangement facilitating the use of overheard information, which would have been discarded in conventional systems, for improving the encoding and scheduling in a sending node. According to the method each receiving node selectively stores received information as a priori information and feeds back information about their respective stored a priori information to a sending node, for example, in the form of Acknowledgements messages. The sending node forms packets, which will in this document be referred to as composite data packets. A composite data packet is formed by jointly encoding multiple data packets to multiple users into a single packet, i.e. the composite packet. The composite packet is formed and scheduled at least partly based on the feedback about the receiving nodes respective a priori information. The sending node transmits the composite data packet to a plurality of receiving nodes. Upon receiving a composite data packet the receiving nodes uses their stored a priori information in the process of extracting data for themselves from the composite data packets. In addition, and in combination with the a priori information feedback, the sending node may utilize conventional feedback, i.e. regular Acknowledgements, informing about received data packets that have been received by the designated receiver or receivers.

The solution described in the co-pending application is applicable in multiuser ARQ (MU-ARQ) that targets multiple Unicast ARQ (e.g. in cellular and multihop systems) sessions from a single sender, as well as in multihop systems where information overhearing may also stem from other senders than the sender node.

With the solution according to the co-pending application fewer data packets need to be sent from the sending node to the plurality of receiving nodes to achieve correct reception of transmitted data packets. The co-pending application proposes a method for optimizing the selection of packets to combine based on the Cartesian product.

In this case, the sender has information about the regular packets, composite packets, and partially decoded composite packets that have been received by the receivers, and based on this, at each transmit instant the sender can form a composite packet given the situation of a priori information in the receiver.

OBJECT OF THE INVENTION

It is an object of the present invention to optimize further the combination of packets to joint composite data packets.

SUMMARY OF THE INVENTION

This object is achieved according to the invention by a method of encoding and scheduling data packets in a communication system, the communication system comprising at least a sending node and at least two receiving nodes, and wherein the at least one sending node is arranged to buffer, schedule, encode and transmit data packets comprising information designated to at least one intended receiving node, the method being characterised by the steps that:

a receiving node selectively stores received data packets for which it is not the intended receiving node as a priori information and feeds back information about the a priori information to the sending node;

the at least one sending node utilizes the information about a priori information received from at least two of the receiving nodes to form and to transmit a composite data packet to at least two receiving nodes, said composite data packet comprising information designated to at least two receiving nodes and encoded in such a way that the intended receiving node for each of the at least two regular packets can decode the composite packet to obtain information, typically in the form of at least one regular data packet, for which it was the intended receiving node, and the sending node transmits the optimal composite packet.

The object is also achieved by a method in a sending node in a communication system of jointly encoding and scheduling multiple data packets, wherein the sending node is adapted for communication with K receiving nodes, where K>1 and the sending node is arranged to buffer, schedule, encode and transmit regular data packets to at least one intended receiving node, the method comprising the steps of:

receiving feedback from at least two of the receiving nodes, said feedback comprising information on packets received by the at least two receiving nodes;

using the feedback, selecting and encoding at least two data packets in such a way that the intended receiving node for each of the at least two regular packets can decode the composite packet to obtain information, typically at least one regular packet, for which it was the intended receiving node.

The object is also achieved by means of a sending node adapted for use in a communication system, wherein the sending node adapted for communication with K receiving nodes, where K>1, by transmitting information in the form of a regular data packet to at least one intended receiving nodes, said sending node comprising:

a feedback receiver adapted to receive and identify a priori information in feedback from receiving nodes;

an a priori information storage module for storing a priori information from a plurality of receiving nodes, the a priori information storage module connected to said feedback receiver;

a joint coding and scheduling module for forming a composite data packet from at least two regular data packets, the joint coding and scheduling module arranged to use a priori information from said a priori information storage module and to determine which multiple individual data packets to retrieve from a buffer module for use in the composite data packet, said sending node being characterized in that the joint coding and scheduling module is arranged to form the composite data packet in such a way that the intended receiving node for each of the at least two regular packets can decode the composite packet to obtain information, typically at least one regular packet, for which it was the intended receiving node.

Hence, the invention proposes a method for selecting packets for generating good composite packets, in particular for generating good composite packets that have reduced complexity compared to the above-mentioned copending patent application (PCT/SE2005/001144).

According to the invention an efficient scheduling method is achieved, which is particularly developed for MU-ARQ. Further the method of forming composite packets is structured and has a manageable complexity.

According to the invention the operation of ARQ is improved by using overheard information in a better way. According to the invention transmissions can be arranged in a certain order to give rise to a particularly suitable situation for creating good composite packets.

Typically a data packet is transmitted as a regular data packet the first time it is transmitted. When a packet is to be retransmitted the sending node determines if it can be used in an optimal composite packet. To this end, the joint coding and scheduling module is arranged to schedule any data packet to be transmitted as a regular data packet the first time it is transmitted, and when a packet is to be retransmitted, to determine if it can be used in an optimal composite packet.

The method preferably comprises the steps of identifying in the sending node which packets have been received by which users;

dividing packets that were not received by their intended recipient into subsets depending on which user or users they have been received by and which user they were intended for;

selecting a level j to consider, where $1<j<K$ and level j denotes a set of all packets that have been received by exactly j users;

selecting at least j+1 subsets of the set, each subset comprising packets received by a first group comprising at least one receiving node and intended for a second group comprising at least one receiving node;

selecting a packet from each of the j+1 subsets;

if an optimal composite packet can be formed on level j, that is, a packet of one packet from each of the j+1 different subsets, forming and transmitting the optimal composite packet.

In this case the joint coding and scheduling means is arranged to schedule packets according to the following:

identifying which packets have been received by which users;

dividing packets that were not received by their intended recipient into subsets depending on which user or users they have been received by and which user they were intended for;

selecting a level j to consider, where $1<j<K$ and level j denotes a set of all packets which have been received by exactly j users;

defining at least j+1 subsets to the set, each subset comprising packets received by a first group comprising at least one receiving node and intended for a second group comprising at least one receiving node, identifying packets that are stored in j+1 subsets; and if an optimal composite packet can be formed on level j, that is, a packet of one packet from each of the j+1 different subsets, forming and transmitting the optimal composite packet.

This offers a systematic approach to determining which optimal composite packets can be formed in any given situation, and on which levels thus providing a possibility to improve the creation of composite packets even more.

If an optimal composite packet cannot be formed on level j, a new value may be selected for j. Alternatively a non-optimal composite packet may be formed on level j, if possible, or a regular packet may be transmitted a second time. The latter alternative may suitably be used, for example if a regular packet that has already been transmitted once is approaching a maximum time to live.

Typically, the composite data packet is received and decoded in the receiving node using a priori information stored in the receiving node.

The method in a sending node preferably comprises the steps of:
- the sending node monitoring if any feedback messages have been received;
- the sending node determining if the feedback is feedback on a priori information from a receiving node or if it is feedback on received own data, and if on own data, the sending node proceeds with regular ARQ operations, and if on a priori information the sending node stores information from the feedback in an a priori information buffer, and returns to the monitoring step.

In a preferred embodiment the sending node forms the composite data packet by joint encoding and scheduling of at least two data packets.

Packets to combine to a composite packet may be selected according to some criterion, for example, the packets having the lowest ARQ sequence number, or the oldest packets. Packets may also be selected according to Quality of Service (QoS) requirements.

When forming the composite multicast packet a number of encoding method can be used, which may be of low complexity. Preferably, a linear method is used, for example one of the following:
- summation over a predetermined b-bit Galois field, such as bitwise XOR-operations,
- modulus-operations are utilized when forming the composite packet. Instead of operating on single bits, segments of bits may be used for the joint encoding. A Galois field of 2 b may be used.

In the joint encoding and scheduling an optimisation may be performed considering different combinations of packets and different combinations of receivers and knowledge of their stored a priori information.

Optimisation supplementary information may be used in addition to the a priori information.

The supplementary information may, for example, comprise one of, or a combination of the parameters: Quality of Service requirements, Channel Quality Indication, routing costs, and data packet characteristics. In this embodiment, the sending node further comprises a supplementary information module in connection with the joint coding and scheduling module, said supplementary information module arranged to store supplementary channel information and to provide the joint coding and scheduling module with supplementary channel information.

Suitably, in this last embodiment, the joint coding and scheduling module is arranged to perform the scheduling and encoding based on information provided both from the a priori information storage module and the supplementary information module.

The present invention may be implemented in any communication system utilizing a broadcast medium, that is, where information transmitted by one node and intended for one specific node may be overheard by other nodes The method may suitably be used in a cellular system the first sending node typically being a base station.

The method according to the invention may also be used in a multihop system or in an ad hoc network.

The invention also relates to a communication system comprising at least one sending node adapted for communication with at least two receiving nodes by transmitting information in the form of multiple individual data packets designated to individual receiving nodes, characterised in that the communication system comprises at least one sending node as defined above.

BRIEF DESCRIPTION OF THE DRAWINGS

The invention will now be described in detail with reference to the appended figures, wherein.

DETAILED DESCRIPTION OF THE INVENTION

In the communication system according to the present invention, a sending entity is engaged in communication with multiple receiving entities. The sending entity, for example a base station (BS) in transmitting operation is referred to as a sending node (SN) and the receiving entity, for example realised as a mobile station (MS), in receiving operation is referred to as the receiving node (RN). It should be noted that a mobile station could also act as a sending node, and a base station as a receiving node. The present invention may advantageously be utilized both in typical cellular systems with a base station in communication with a plurality of mobile stations and in ad hoc systems, wherein at least one mobile station communicates with at least two other mobile stations to enable communication. As previously described, various scheduling schemes may be utilized in such systems to enhance performance and different types of ARQ-schemes may be used to increase the reliability of the transmissions.

Figure 1:
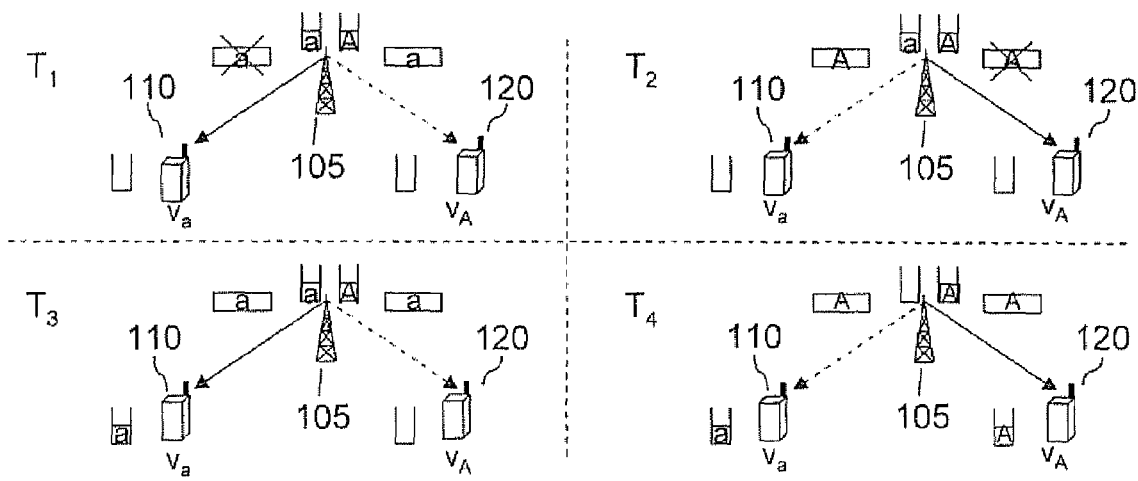
FIG. 1 is a schematic illustration of the transmission sequences in a cellular system according to Prior Art.

Firstly, a traditional prior art ARQ scheme is considered. The traditional ARQ scheme between one sender and one receiver will henceforth be referred to as Unicast ARQ. It should be noted that, for example in a cellular system for downlink, multiple Unicast ARQ sessions are running concurrently to different users where each user may have multiple flows with their own Unicast ARQ instance. Illustrated in FIG. 1 is a sending node, in this case a base station 105 in communication with two receiving nodes, $v_a$ and $v_A$, respectively, realised as the mobile station 110, and the mobile station 120. Hence, two Unicast ARQ protocols are running in parallel, the first between base station 105 and the mobile station 110 and the second between base station 105 and the mobile station 120. In the example illustrated in FIG. 1, at time $T_1$ the sending node, base station 105, sends information in form of data packet (a) to mobile station 110, wherein the data packet (a) was not received correctly by the mobile station 110. The data packet (a) may also be received (overheard) by other user(s), for example the receiving node $v_A$ (mobile station 120). However, according to prior art Unicast ARQ schemes, such overheard data packets are discarded by the receiving node $v_A$. Alternatively, if the receiving node $v_A$ has knowledge that it is not the intended receiving node, the data packets are not regarded at all. At $T_2$ data packet (A) is sent from the sending node 105 to mobile station 120, but also this transmission fails. Through the ARQ procedures the sending node 105 is provided with acknowledgement information and at time $T_3$ and $T_4$, the sending node 105 re-transmits packet (a) and packet (A) respectively. The two receiving nodes $v_a$ and $v_a$ correctly receives their respective data packet (a) and (A). It should be noted that the transmissions in $T_1$ and $T_2$ could occur at the same time if a transmission technology allowing for concurrent transmissions, for example Orthogonal Frequency Division Multiple Access (OFDMA), is utilized, i.e. packet (A) and packet (a) are sent concurrently but on non-overlapping sets of OFDM subcarriers. The re-transmission could also occur concurrently.

Figure 2:
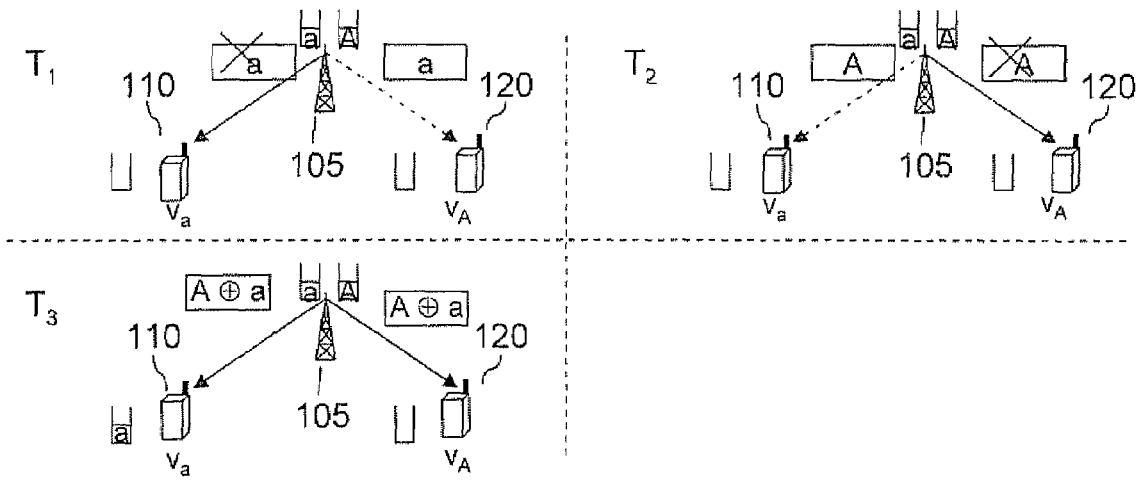
FIG. 2 is a schematic illustration of the transmission sequences in a cellular system according to the present invention.

FIG. 2 illustrates the same situation as in FIG. 1 but handled according to the invention. At T1 and T2 packets a and A are transmitted and each packet is received only by the unintended receiver, as in FIG. 1. According to the invention, instead of transmitting each of the packets a and A again separately, these two packets are combined to a composite packet designated as A$\oplus$a in FIG. 2. The composite packet is formed in such a way that the receiving node $v_A$, having knowledge of packet (a), can decode the composite packet to obtain the information of packet (A). Similarly, the receiving node $v_a$, having knowledge of packet (A), can decode the composite packet to obtain the information of packet (a). How to form composite packets will be discussed in more detail in the following. Using a composite packet according to the invention, only one packet needs to be resent instead of two packets in the prior art. To use the network resources even more efficiently, if there are more than two receiving nodes, more than two packets can be combined to a composite packet. To form an optimal composite packet to be sent to a number j of receiving nodes, the composite packet should comprise j regular packets and each of the j receiving nodes should have received j-1 of these packets as a priori information. In this way, each receiving node will be able to decode the composite packet to obtain the one packet that it had not received.

According to the method and arrangement of the present invention, a priori information e.g. overheard information as the discarded data packets in the above examples, are stored in the receiving nodes that receive them unintentionally, and are utilized to improve the throughput in the communication system. The receiving nodes selectively store received information as a priori information and feed back information about their respective stored a priori information to the sending node. The sending node forms composite data packets by jointly encoding and scheduling multiple data packets to multiple users at least partly based on the feedback on the receiving nodes respective a priori information. In addition, and in combination with the a priori information feedback, the sending node may utilize conventional feedback informing about received data packets. The composite data packet is transmitted to the receiving nodes. Upon receiving a composite data packet the receiving nodes use their stored a priori information in the process of extracting data for themselves from the composite data packets. Thereby, fewer data packets need to be sent from the sending node to the plurality of receiving nodes to achieve correct reception of transmitted data packets. The invention is applicable in multiple Unicast ARQ (e.g. in cellular and multihop systems) as well as in multihop systems where information overhearing may also stem from other senders than the sender node.

Figure 3:
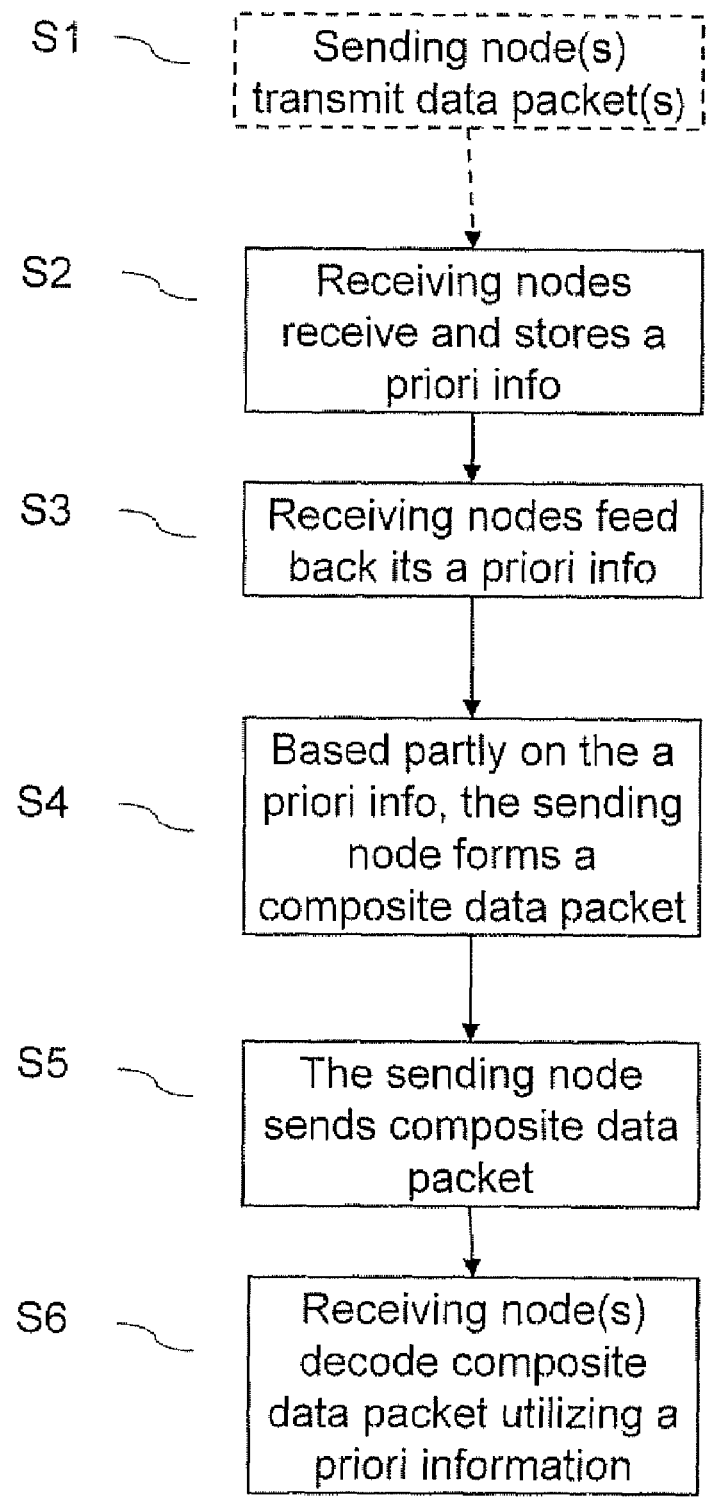
FIG. 3 is a flowchart over the method disclosed in the above-mentioned co-pending application.
Figure 4:
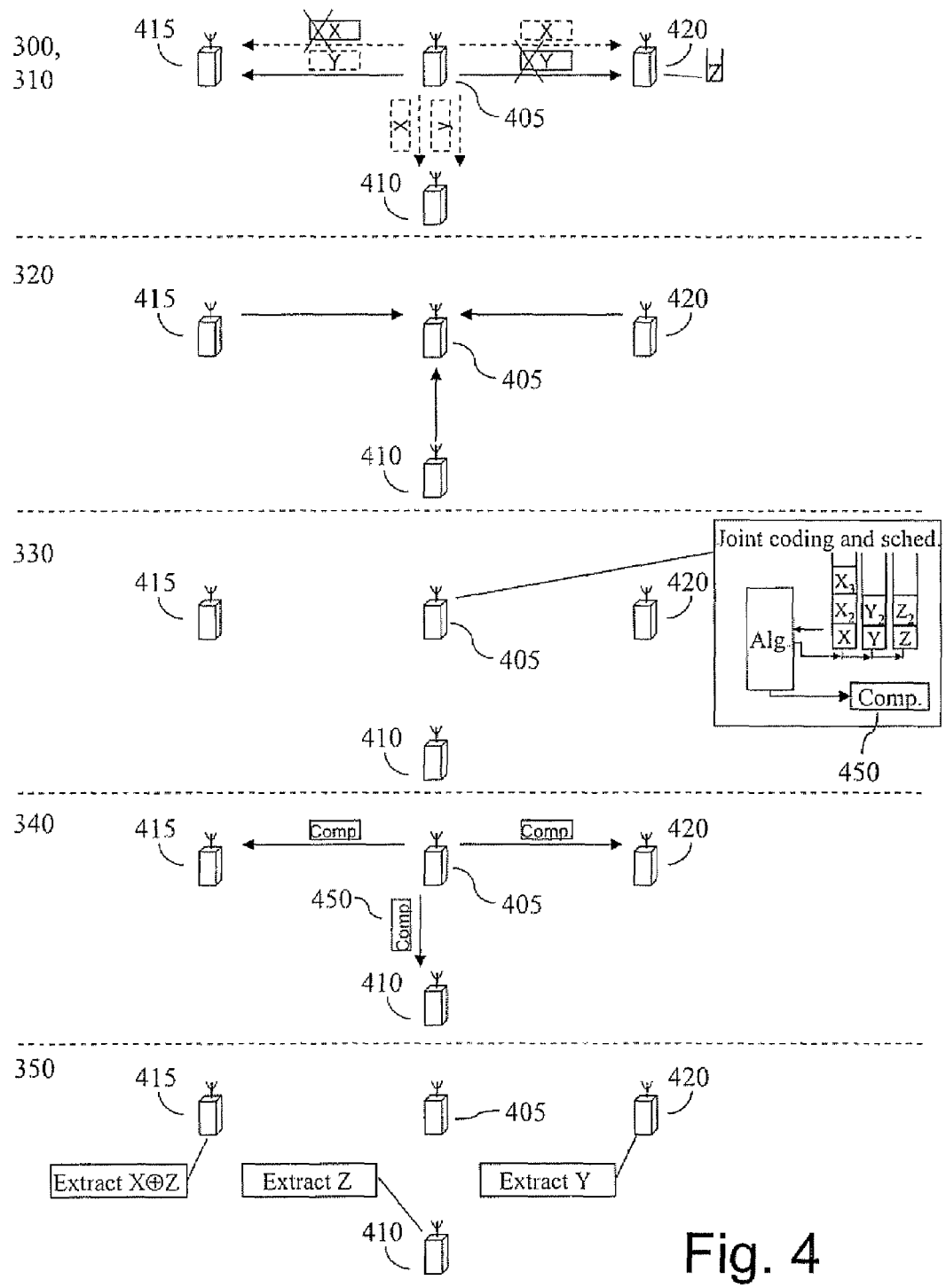
FIG. 4 is a schematic illustration of the transmission sequences in a communication system according to the present invention.

The principle on a high level of the method according to the present invention is illustrated in the flowchart of FIG. 3 and the schematic transmission scheme of FIG. 4. As illustrated in the figures a plurality of radio nodes 405, 410, 415, which are parts in a wireless communication system, are in the process of exchanging information in the form of data packets. The term radio nodes should be interpreted widely; any device capable of radio communication and compliant to the standards used in the wireless communication network can be seen as a radio node. Typically a radio node is capable of both sending and receiving data packets, which will be referred to as sending and receiving operation, respectively, or sending/receiving node meaning a radio node in sending/receiving operation. Radio nodes include, but are not limited to: radio base stations, mobile stations, laptop computers and PDAs equipped with wireless communication means and vehicles and machinery equipped with wireless communication means. In the example, radio node 405 is primarily in sending operation (sending node 405) and the nodes 410, 415, and 420 are primarily in receiving operation (receiving nodes 410, 415, 420). Solid lines indicate designated transmissions and dashed lines indicate overheard transmissions. Crossed packets indicate failed reception. The method according to the invention is preferably preceded by an initial exchange of individual data packet, the preceding step 300 comprises:

Step S1: Data packets, here illustrated with packets (X) and (Y), are sent from one or more radio nodes in sending operation, here sending node 405, to a plurality of receiving nodes 410, 415, 420. Typically each individual data packet has a designated receiving node. The transmission of data packets may occur concurrently or subsequently, depending on transmission technology.

The method according to the invention comprises the steps of:

Step S2: The receiving nodes 410, 415, 420 store their respective data packets, i.e. the information intended for them, that is, packets that were correctly received. In addition receiving nodes may receive and store overheard information, i.e. data packets intended for other receiving nodes but which the receiving node in question received and could decode, and/or data packets which has been sent to the receiving node in question in a multihop scenario for further transfer to their final destination. The overheard information make up the a priori information of each receiving node 410, 415, 420. In the depicted example data packets (X) and (Y) are the a priori information of node 410, (Y) the a priori information of node 415, and (X) and (Z) a priori information of node 420, (Z) being received previously.

Step S3: The receiving nodes 410, 415, 420 feed back to the sending node 405, or sending nodes, information of respective a priori information. Typically receiving nodes also feed back information on the outcome of the transmission using ARQ procedures, for example.

Step S4: The sending node 405 forms, if possible and advantageous, a composite data packet 450 by using the fed back knowledge of respective a priori information from the receiving nodes 410, 415, 420. The composite data packet comprises data designated for at least two different receiving nodes. Preferably, the knowledge of the a priori information is used by the sending node 405 to schedule which individual data packets to be comprised in the composite data packet and to jointly encode the multiple individual data packets to be comprised in the composite data packet. At least a part of the composite data packet should consist of the jointly encoded multiple individual data packets. A characteristic of the composite packet encoding is that the number of bits in the composite packet is less than sum of the number of bits of the parts of the packets that are jointly encoded. The process will hereafter be referred to as joint encoding and scheduling, and will be further discussed and exemplified below. The sending node may form a plurality of different composite packets designated for different pairs, or groups, of receiving nodes. In the example the sending node 405 forms a composite data packet comprising data from (X), (Y) and (Z).

Step S5: The sending node 405 transmits the composite data packet to designated receiving nodes, in the example of FIG. 4, the receiving nodes 410, 415, 420.

Step S6: After receiving the composite data packet, the receiving nodes 410, 415, 420 decode, if possible, the composite data packet and extract respective own data that was previously unknown to respective receiving node. In the decoding and extracting process, the stored a priori known information and possibly own data packets previously decoded by the receiver, is utilized. On occasion a receiving node may not have the full information needed to fully decode and extract own data from the composite data packet. If this is the case the receiving node may partly decode the composite data packet, and store the result, a residual composite data packet, for further processing when other information is available, for example other data packets designated to that receiving node send from the sending node 405, or overheard data packets. Alternatively the composite data packet is stored without attempting to decode, until the receiving node has acquired all required information. Information on the information required to decode the major part of the composite data packet may be comprised in a header. In the example, node 420 could extract (Y) and node 410 extract (Z). Node 415 could extract a residual composite data packet.

The a priori information fed back from the receiving nodes 410, 415, 420 to the sending node 405 may preferably be combined with feedback on which data packets have been received, and which have not—given that such information can be determined, of own data packets, i.e. data packets of which the specific receiving node was the designated receiver. Hence the additional feedback of a priori information can be seen as an extension to traditional Unicast ARQ feedback, in that a node reports the decoding result also for other transmissions not intended for the node. The combination of a priori feedback and traditional Unicast ARQ feedback may be referred to as an extended or a full received packet status. Here, "full" means all status information, whereas "extended" indicates more feedback information than provided with traditional Unicast ARQ.

The overheard data packets, received in step S2, are typically either regular data packets or composite data packets. Alternatively or in combination, composite data packets may be used as a priori information by a receiving node, even if the receiving node at the moment does not have enough information to decode the composite packet.

While the above described a situation where overheard information from other transmitters (than the one ultimately sending the composite data packet) was utilized as a priori information, also other combinations and ways to get a priori known information are possible. For instance, one may also exploit earlier transmissions from the same sender. In addition, other receiving nodes may also decode the composite data packet and extract data packets not designated for them, that may then be used as a priori information in future decoding process of composite data packets designated for them.

It should be noted that it may on occasion only be possible to partially decode the jointly encoded data packet, e.g. when three or more data packets are jointly encoded and only one a priori data packet is known and stored by the receiving node. An example is encoding of packet A, B and C, wherein only packet C resides in the receiving node. Then, the combination A encoded with B will be extracted in the decoding process, and subsequently stored as well as reported to the sending node (or including also other sending nodes). Note that the received packet status then indicates that A and B are still jointly encoded. A sending node may at the scheduling process include the knowledge of that the a priori information residing at one or more receiving nodes is at least partly jointly encoded. At the decoding in a receiver, it may exploit at least partly jointly encoded packet information as a priori knowledge in receiving and decoding a composite packet.

Figure 7:
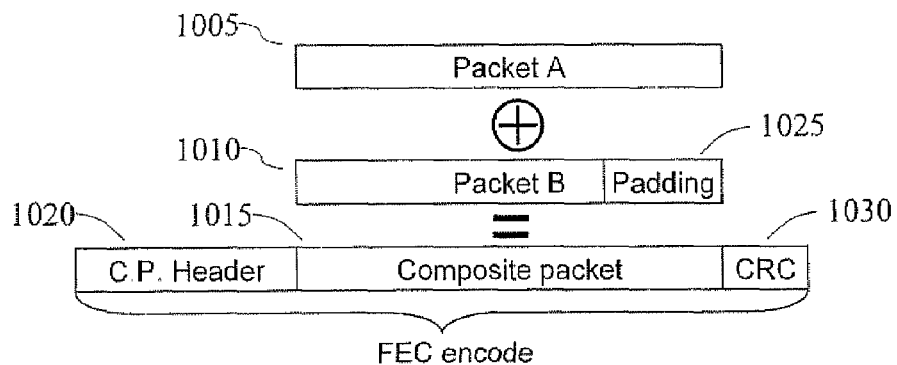
FIG. 7 is a schematic illustration of the encoding principles according to one embodiment of the present invention.

As previously indicated, in the method according to the present invention, both composite data packets and regular data packets need to be handled by a receiving node and a sending node. In the above-mentioned co-pending application, the flow-chart of FIG. 7 illustrates an embodiment of the invention, representing an implementation of the method in a receiving node. The term "regular data packet" denotes a non-composite data packet, i.e. data packets of the type also used in prior art. The flowchart of FIG. 8 of the co-pending application illustrates an embodiment in a sending node.

Figure 5:
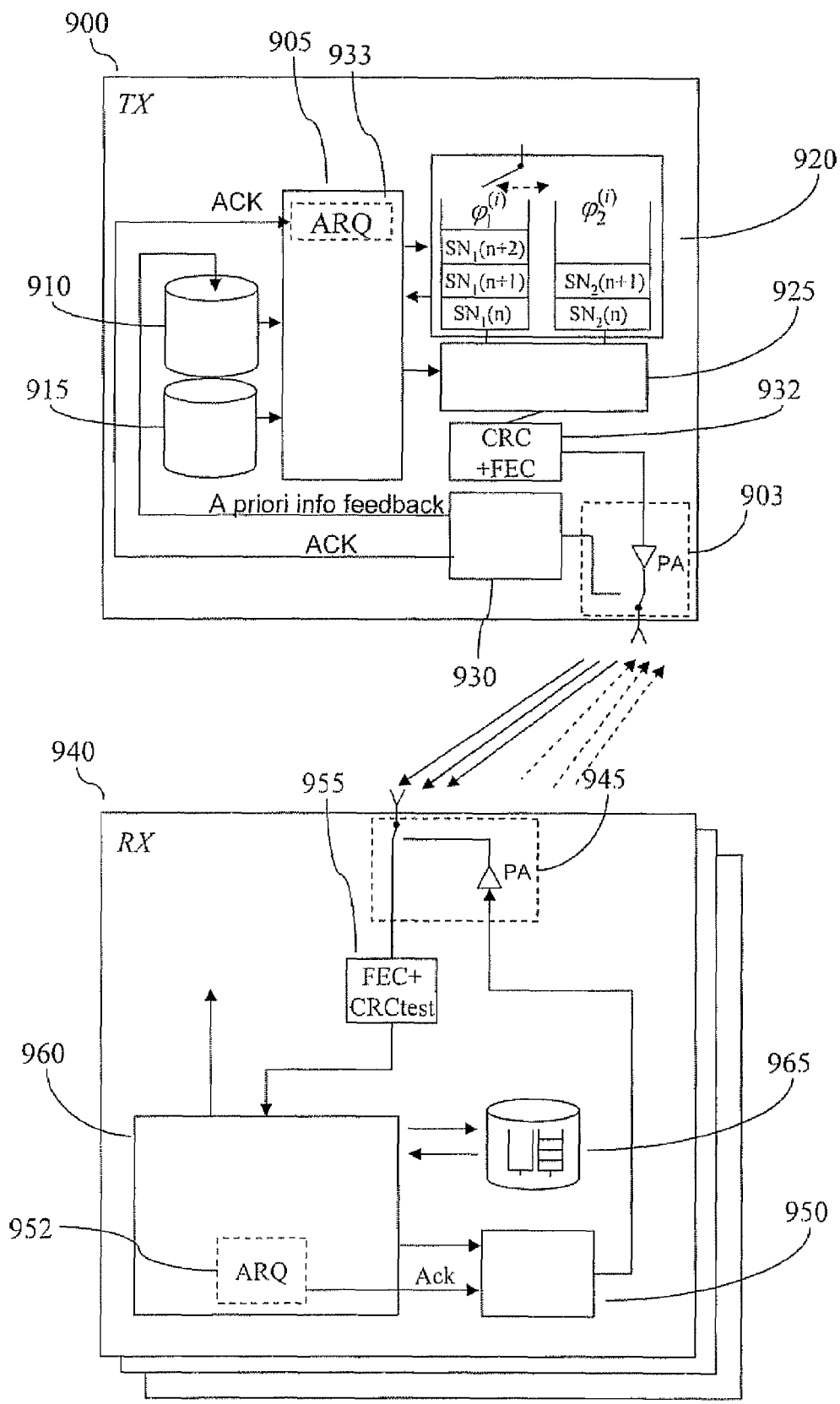
FIG. 5 is a schematic illustration of the transmitter and receiver according to the present invention.

An arrangement according to the present invention, suitable for effectuating the above described embodiments is schematically illustrated in FIG. 5. The modules and blocks according to the present invention described above are to be regarded as functional parts of a sending and/or receiving node in a communication system, and not necessarily as physical objects by themselves. The modules and blocks are at least partly preferably implemented as software code means, to be adapted to effectuate the method according to the invention. The term "comprising" does primarily refer to a logical structure and the term "connected" should here be interpreted as links between functional parts and not necessarily physical connections. However, depending on the chosen implementation, certain modules may be realized as physically distinctive objects in a receiver or transmitter.

The transmitter 900 of a sending node comprises transmitting means 903, which provides the necessary functionalities for performing the actual transmission. Suitable transmitting means for example radio-transmitting means is known to the skilled person. The transmitter 900 further comprises a joint coding and scheduling module 905, wherein the joint coding and scheduling algorithm resides. The joint coding and scheduling module 905 is in communication with an a priori information module 910; a supplementary information module 915; a buffer module 920; and a coder and PDU collator module 925. The transmitter also comprises means for receiving and handling feedback messages 930, both ACKs and/or NACKs for packets that have been received by the designated receiver and feedback comprising a priori information from the receiving nodes. The joint coding and scheduling module 905 comprises means for the regular ARQ operations 933. The a priori information module 910 stores and updates a received packet status list based on the feedback from the receiving nodes, i.e. the extended or full-received packet status. The buffer module 920 provides sending buffers, typically one for each flow. Assuming that the transmitter intend to send a packet, it considers what packet resides in the send buffers of the buffer module 920 and the a priori information of the different receiving nodes which is stored in the a priori information module 910. Possibly supplementary knowledge, provided by the supplementary information module

915, is also used for the scheduling. Supplementary information include, but is not limited to: Channel Quality Information (CQI) per link used in opportunistic scheduling, to be further described, QoS requirements, for the possibility to enhance the invention with QoS scheduling aspects, as well as status of individual packets, e.g. their time to live value. In the multihop case, for a distributed implementation, the supplementary information module 915 also comprises means for determining routing costs as well as means for finding out the routing cost of neighbouring nodes, and thereby enabling the scheduler to consider the routing costs of neighbouring nodes as well as its own routing cost in order to ensure that data packets heads towards the intended destination as well as allowing for routing optimal scheduling decisions. If mobility is reasonable low, an alternative to the distributed case could be a centralized route and cost determination. For this latter case, route related information is then disseminated from a central node to other nodes in the network. Based on those parameters, and possibly additional parameters, one or more packets are fetched from the send buffers to the coder and PDU collator module 925. If multiple packets are collected, they are jointly encoded to form a composite data packet by the coder and PDU collator module 925, and then, CRC and FEC are (preferably) added and the packets are transmitted by the radio transmitting means 905.

The receiver 940 of a receiving node comprises receiving means 945, which provides the necessary functionalities for performing the actual reception. Suitable receiving means, for example radio receivers, is known to the skilled person. The receiver further comprises means for issuing and handling feedback messages, both ARQ-related and relating to a priori information 950; a FEC decoding and CRC module 955 in connection with the receiving means 945; a PDU identification module and decoding module 960 and an a priori information buffer 965. The PDU identification and decoding module 960 is in connection with the FEC decoding and CRC module 955 and the a priori information buffer 965 as well as upper layer functions/modules (not shown) for providing the received data. The a priori information buffer 965 comprises buffers for correctly decoded packets (here decoded packets means that the CRC is correct, however it could still have some residual composite encoding, i.e. removed the influence of a packet A, but packet B and C are still encoded together), e.g. overheard data packets designated for other receivers. The PDU identification module and decoding module 960 comprises ARQ means 952. ARQ means 952 should be interpreted broadly, i.e. capable to handle positive, negative acknowledgements or a combination thereof.

The receiver 940 decodes the packet and identifies which packets have been encoded together. Based on a priori knowledge of previously correctly received packets (intended for other users) and the received jointly encoded packet, the receiving node extracts new information. The newly decoded information may then, if it is designated for this node, be forwarded to higher layers or stored in the a priori information buffer 965. In the case that it is only possible to partially decode the composite data packet, e.g. when three or more data packets are jointly encoded and only one a priori data packet is available for the receiver 940, then the residual jointly encoded information, a residual composite data packet, is stored. An example is a transmission of a composite data packet which comprises the jointly encoded data packets A, B and C, and wherein only packet C resides in the receiver. Then, a residual composite data packet, the combination A encoded with B, will be stored in the a priori information buffer 965 of the receiver 940.

After a receiver 940 has successfully received an encoded data packet, it updates the received packet status list residing in the a priori information module 910 of the transmitter 900, immediately or with a slight delay. The delay may be useful for not occupying resources and waste energy unnecessarily due to the overhead of each feedback packet. The update is achieved via the ARQ means 952 of the receiver 940 and the ARQ means 933 of the transmitter 900.

Moreover, note that the receiver 940 may also act as a transmitter if the data is subsequently forwarded. The same is true for the transmitter 900, i.e. it may also act as a receiver for other data.

By utilizing a priori information, e.g. overheard information and by letting both the sending node (through feedback information) and the receiving node exploit these information, it is possible to reduce the number of transmissions needed to transfer a certain amount of data from one node to another, and in the multihop scenario from the source to the final destination. This will enhance the aggregate throughput as well as the single user throughput. In addition, the end-to-end latency characteristics will be improved. Alternatively, depending on the conditions, the reduced number of transmissions can be used to improve power and energy efficiency in a sender and multiple receivers communication system.

In particular, the performance of multiple parallel Unicast ARQ is possible to enhance, with respect to throughput and delay as well as energy consumption.

Moreover, the performance of forwarding scheduling algorithms in a multihop network is possible to enhance, with respect to throughput and delay as well as energy consumption. With respect to multihop forwarding, one additional objective of the invention is to enhance so called opportunistic multihop forwarding scheme, i.e. schemes that strive to adapt the transmission such that peak opportunities, such as those offered by channel and unpredictable interference fluctuation, are exploited when selecting whom to communicate with.

Figure 6:
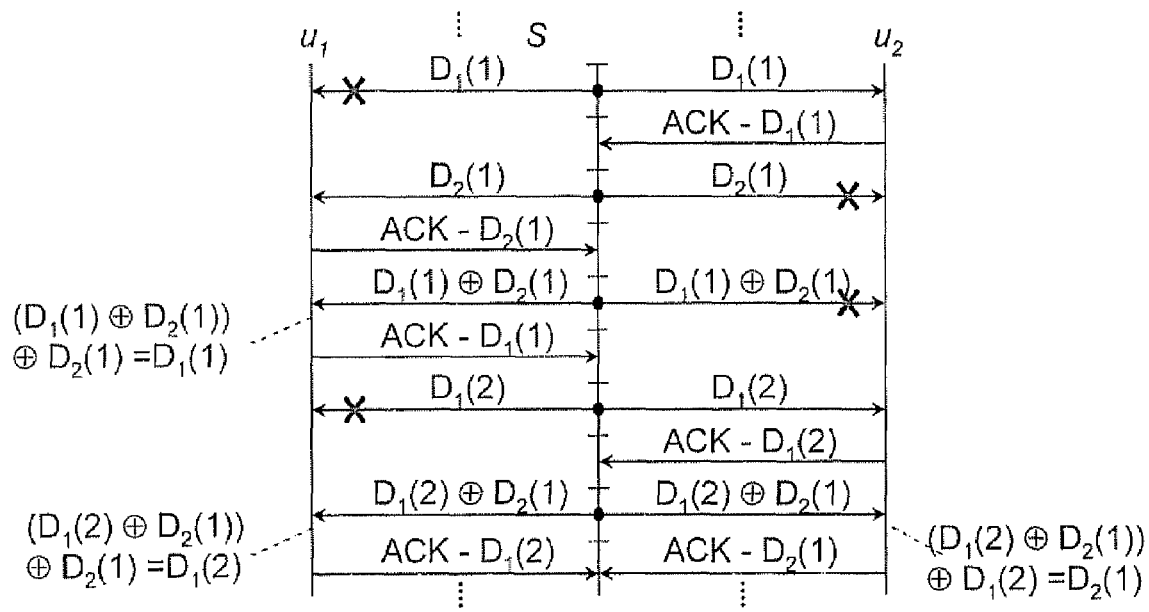
FIG. 6 illustrates multi-user ARQ communication.

FIG. 6 illustrates multi-user ARQ communication. A sender S transmits packets to a first u1 and a second u2 user.

At first a packet D1(1) intended for the first user is transmitted. The packet is received by the second user, which acknowledges the receipt of the packet, but not by the first user. Next, a packet D2(1) intended for the second user is transmitted. The packet is received by the first user, which acknowledges the receipt, but not by the second user. Hence, the sending unit S knows that none of the transmitted packets were received by its intended user, but both were received by the other user.

According to the above-mentioned co-pending application, instead of sending each packet D1(1) and D2(1) again, the sender can encode a composite packet based on the two packets, according to the following:

$$D1(1) \oplus D2(1)$$

Since both users u1 and u2 have knowledge of one of the packets used in the composite packet, each user can decode the packet to obtain the information that it had not yet received.

In the example, however, the composite packet was only received by the first user u1, which decodes the packet according to the following:

$$(D1(1) \oplus D2(1)) \oplus D2(1) = D1(1)$$

The first user also acknowledges receipt. Since only one packet has not been received, no composite packet can be formed. The sender therefore transmits another packet D1(2) intended for the first user u1. Again, this packet is received only by the second user u2, which acknowledges receipt. The sender S then forms another composite packet, according to the following:

$$D1(2) \oplus D2(1)$$

This composite packet is received by both users u1, u2 and both receivers can decode the composite packet to obtain the information they had not received. The first user u1 decodes according to the following:

$$(D1(2) \oplus D2(1)) \oplus 2(1) = D1(2)$$

The second user u2 decodes its packet according to the following:

$$(D1(2) \oplus D2(1)) \oplus D1(2) = D2(1)$$

As can be seen, the probability of one receiver receiving and successfully decoding a packet intended for it is almost twice as large as the probability of the intended recipient receiving and decoding a regular packet intended for it.

Encoding Methods

In the example above, the method for encoding suitable for the method according to the present invention is based on XOR bitwise encoding. This is a very suitable method, because of its simplicity. Other codes may also be used such as an erasure code like Reed Solomon. With respect to the Reed Solomon type of coding, the same operation as the XOR operation between two words is for instance possible if one selects a shortened RS code with K=2 and with N=3 codewords. The non-systematic codeword N-K=1 is resent instead of the two bitwise XORed words. Other erasure codes or erasure code oriented encodings may also be used.

Instead of operating on single bits, segments of b bits may be used for the joint encoding. A Galois field of $2^b$ may then be used, under which addition is the encoding operation. With this notation, the XOR operation is just a addition in Galois field of $2^1$.

Many different methods to jointly XOR encode and then identify which packets are jointly coded together may be envisioned. An example of possible code-frame formats is given with reference to the illustrations of FIG. 7. In the example, two data packets (A) 1005 and (B) 1010 are jointly coded to form the composite data packet 1015. The payload can be XORed directly, but means for identifying, which individual packets where encoded together need to be offered. In one encoding method, FIG. 10, identifiers (e.g. headers or subset of relevant information from individual packet headers) of the involved jointly encoded packets (here only two packets are shown, but can easily be extended to more packets) are signalled in a composite packet header 1020. An identifier may for instance comprise source node ID, destination node ID, and packet sequence number for each encoded packet. Apart from the identifiers, the composite packet header also signals the format of the composite packet, i.e. where the packets are placed in the composite packet. For instance, if one has two packets and one of the packets contain fewer bits than the other packet, as in FIG. 7, the number of bits contained in the packet with fewer bits as well as the position of the first bit of the shorter packet is also indicated. The position of first bit may be predetermined and known to the sender and the receiver so it may not need to be signalled. When the number of bits differs, padding 1025 is utilized, as in FIG. 7 with packet B 1010. The format field of the composite packet header 1020 could also signal that two packets B and C are concatenated one after the other (not shown) and then encoded with e.g. a third packet A or more packets. After correct FEC decoding and detecting a correct CRC 1030, the exemplified composite packet header enables easy identification of which packets have been encoded together. The receiver uses this information to fetch the a priori known packet from the decoded data packets storage, and extract the other packet(s). It should be noted that the composite packet header may also contain other information, as in a multihop network, one may apart from packet identifiers be interested which relay station is sending and which relay stations shall receive.

Another encoding version than the one illustrated above (not shown) is to signal the composite packet header in a common broadcast message, i.e. a sort of out of band signalling. Yet a further encoding method (not shown), could involve a blind identification approach, i.e. testing hypothesis of encoded messages against the database of a priori information and using a CRC check to test the validity of the hypothesis testing.

The present invention is not limited to the use of XOR-operations in the encoding of the composite data packets. The coding operations are preferably adapted to the applied transmission technology, processing capacities, sensitivity to delays etc. A further example of an encoding operation suitable to use in the method according to the invention is based on the modulus operator. Per signal constellation symbol encoding is considered in the following, and the procedure can be repeated for multiple consecutive signal constellation symbols. The modulus operation is in this example performed both for the real and imaginary part independently when handling complex numbers and utilize a definition of the modulus operation and the mathematical observation that:

$$((A+B) \bmod L - B) \bmod L = (A) \bmod L,$$

which indicates that a real valued signal B can be superimposed on a real valued signal A and allow undisturbed recovery of the signal A (as long as the signal A does not exceed the quantization level L), while the amplitude (and hence the power) is limited of the (non-linearly encoded) composite signal.

In practise, this can be used as follows. The sender has symbols $S_1$ and $S_2$ that typically assumes distinct values. For instance in 16 QAM, $S_i \in \{-3,-1,1,3\} + i \cdot \{-3,-1,1,3\}$. Now, as the receiver has knowledge of the data sequence $D_2(n)$, it also has knowledge of the corresponding symbol $S_2$ (for every $S_1$). Then for the real part (and equally for the imaginary part), the jointly and encoded signal at the transmitter is $$S_1^{(Re)} + S_2^{(Re)}) \bmod L,$$

which is then received and equalized, i.e. compensated for path loss (ensuring that same scale is used for the received signal and the signal that is subtracted), and complex phase (ensuring respective In-phase and Quadrature phase axis are aligned with the signal that is subtracted), to yield the received signal $$R^{(Re)} = (S_1^{(Re)} + S_2^{(Re)}) \bmod L + N^{(Re)},$$

where $N^{(Re)}$ is the noise (and interference) term. The desired signal is then recovered with $$\hat{S}_1^{(Re)} = ((R^{(Re)}) \bmod L - S_2^{(Re)}) \bmod L = (S_1^{(Re)} + N^{(Re)}) \bmod L$$

The non-linear encoding could also be accomplished by quantization by means of a higher dimensional lattice than just one dimensional quantization as has been described above. In this case the quantization operates on a vector rather than a scalar.

Instead of operating on single bits, segments of b bits may be used for the joint encoding. A Galois field of $2^b$ may then be used, under which addition is the encoding operation. With this notation, the XOR operation is just an addition in Galois field of $2^1$.

In order to avoid that the receiver feeds back information about data packets for other receivers that has already been received by the designated receiver, as well as unnecessarily store those packets, a flush method is needed. The above mentioned co-pending application discusses in detail the methods for feedback messages from the receivers to the transmitter, and the handling of the flush messages related to when a previously received packet can be discarded.

Figure 8:
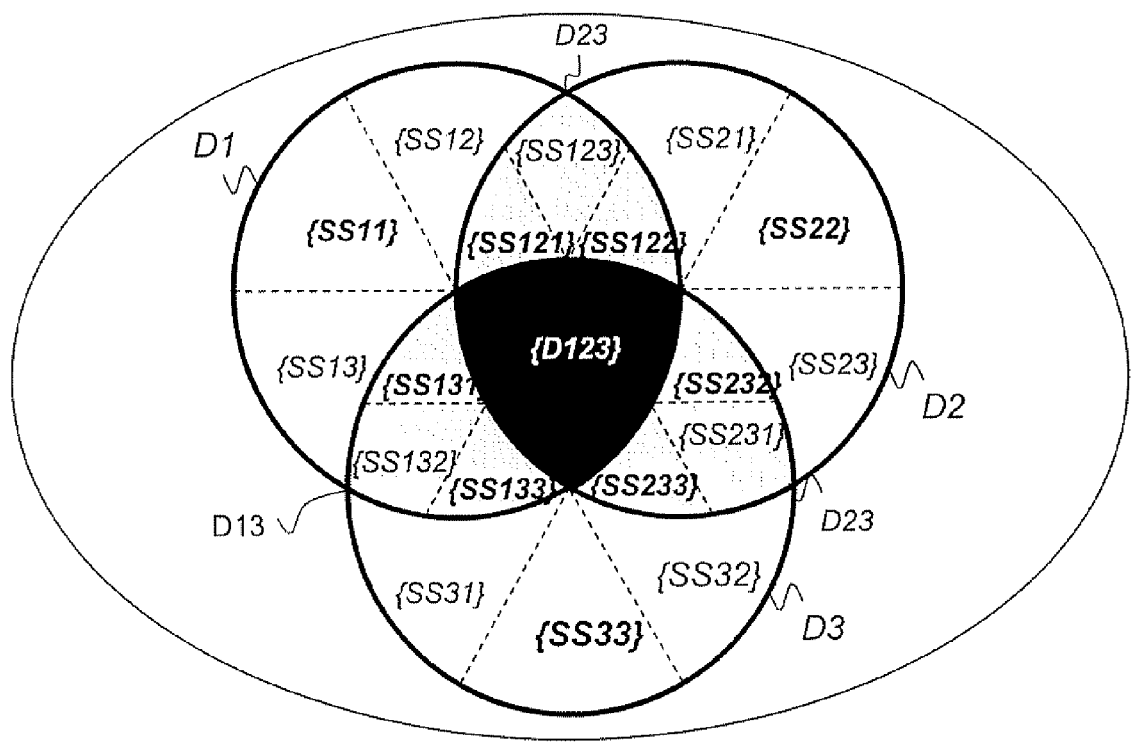
FIG. 8 illustrates schematically the packet forming method of the present invention.

FIG. 8 illustrates schematically the information available to a scheduler in a multi-user ARQ system when performing optimal composite packet encoding as outlined above. A number of users K=3 is assumed. Further, it is assumed that a number of regular data packets have been sent out from the transmitter to each receiver and that each receiver has acknowledged all the regular data packets that it has received and decoded. This means that each receiver has acknowledged to the transmitter both the received packets that were intended for it as well as packets intended for other receivers that were accidentally received by the receiver.

The packets can be divided in 8 different subsets:
packets that were not received by any receiver
A set D123 of packets that were received by all receivers
A set D1 of packets that were received only by receiver R1
A set D2 of packets that were received only by receiver R2
A set D3 of packets that were received only by receiver R3
A set D12 of packets that were received by receivers R1 and R2
A set D13 of packets that were received by receivers R1 and R3
A set D23 of packets that were received by receivers R2 and R3

Of the set D1 received only by receiver R1 there will be a subset SS11 of packets that were intended for receiver R1, a subset SS12 of packets that were intended for receiver R2 and a subset SS13 of packets that were intended for receiver R3.

Of the set D2 received only by receiver R2 there will be a subset SS21 of packets that were intended for receiver R1, a subset SS22 of packets that were intended for receiver R2 and a subset SS23 of packets that were intended for receiver R3.

Of the set D3 received only by receiver R3 there will be a subset SS31 of packets that were intended for receiver R1, a subset SS22 of packets that were intended for receiver R2 and a subset SS33 of packets that were intended for receiver R3.

Of the set D12 received by receivers R1 and R2 there will be a subset SS121 of packets that were intended for receiver R1, a subset S122 of packets that were intended for receiver R2 and a subset SS123 of packets that were intended for receiver R3.

Of the set D13 received by receivers R1 and R3 there will be a subset SS131 of packets that were intended for receiver R1, a subset SS132 of packets that were intended for receiver R2 and a subset S133 of packets that were intended for receiver R3.

Of the set D23 received by receivers R2 and R3 there will be a subset SS231 of packets that were intended for receiver R1, a subset SS232 of packets that were intended for receiver R2 and a subset SS233 of packets that were intended for receiver R3.

The subsets SS11, SS22, SS33, SS121, SS122, SS131, SS133, SS232 and SS233, comprising packets that were actually received by the receiver for which they were intended need not be retransmitted. These subsets are indicated in bold characters in FIG. 8.

The packets that were not received by any receiver should be retransmitted as regular packets, since they cannot be combined with any other packets in such a way that they can be decoded by any of the receivers.

Any packets comprised in the subsets SS12, SS13, SS21, SS23, SS31, SS32, SS123, SS132 and SS231, or that were not received by any receiver should also be retransmitted. As explained above, composite packets are formed from two or more of these packets to the extent possible, in order to make the transmission more efficient. An optimal composite packet is defined as a composite packet encoding j+1 different packets in such a way that when received by any of its designated j+1 users, each user can decode one new data packet that is also intended for this user. Here, the number j also indicates the sets of packets of which each has been received by j receivers (or users). This set of packets will occasionally be referred to as "level j" packets.

Having the complete information about which packets have been received and decoded by which receiver, the scheduler should now identify suitable packets to combine into composite packets. For example, one packet from each of the subsets SS123, SS132 and SS231, each of which were received by two unintended users but not by their respective intended receiver, may be combined to form one composite packet. Since each of the receivers R1, R2, R3 has knowledge of two of the packets, each receiver will be able to decode this composite packet to retrieve the information in the packet intended for it.

The packets that have been received only by one receiver can only be combined in pairs, in which each packet was received by a different receiver. For example, one packet from subset SS12 and one packet from subset SS21 may be combined to a composite packet. This packet may be decoded by receiver R1 to provide the packet from subset SS21, which was intended for receiver R1 but not previously received by it. It may also be decoded by receiver R2 to provide the packet from subset SS12 which was intended for receiver R2 but not previously received by it.

Similarly, one packet from subset SS32 and one packet from subset SS23 may be combined to a composite packet. This packet may be decoded by receiver R2 to provide the packet from subset SS32, which was intended for receiver R2 but not previously received by it. It may also be decoded by receiver R3 to provide the packet from subset SS32 which was intended for receiver R3 but not previously received by it.

If an optimal composite packet cannot be formed on a level j because not all the subsets needed have packets, the scheduler may wait during regular packet transmission until there is at least one packet in each of the relevant subsets. Alternatively, the packets present in the subsets may be used to form composite packets on other levels than level j.

If the time it takes for any packet awaiting retransmission until an optimal composite packet can be formed is too long, for example exceeds some threshold, this packet may also be retransmitted as a regular packet. Alternatively, it may be used in a non-optimal composite packet. Other criteria may also trigger retransmission of a packet as a regular packet, or a non-optimal composite packet, instead of as an optimal composite packet. Such criteria could be a minimum data rate or other Quality of Service related parameter.

Figure 9:
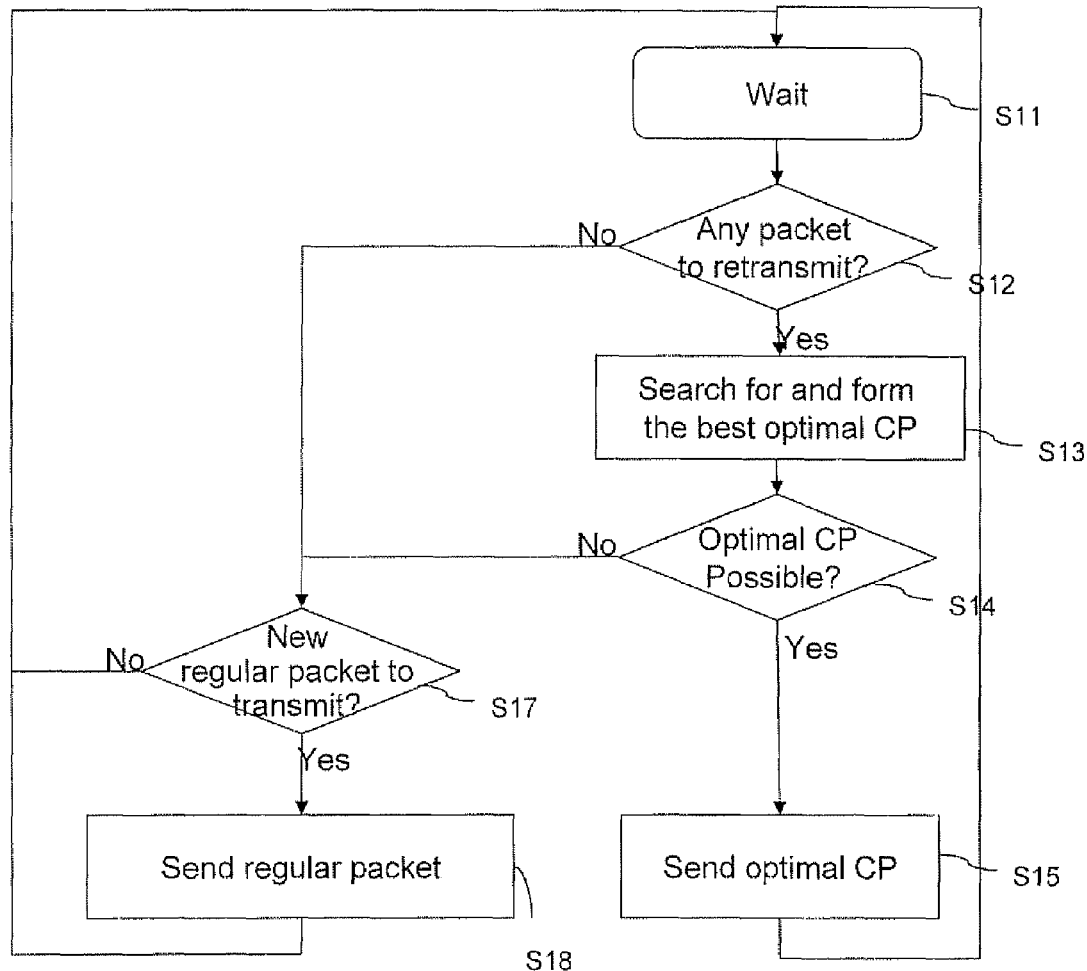
FIG. 9 is a flow chart of a first embodiment of the inventive method.
Figure 10:
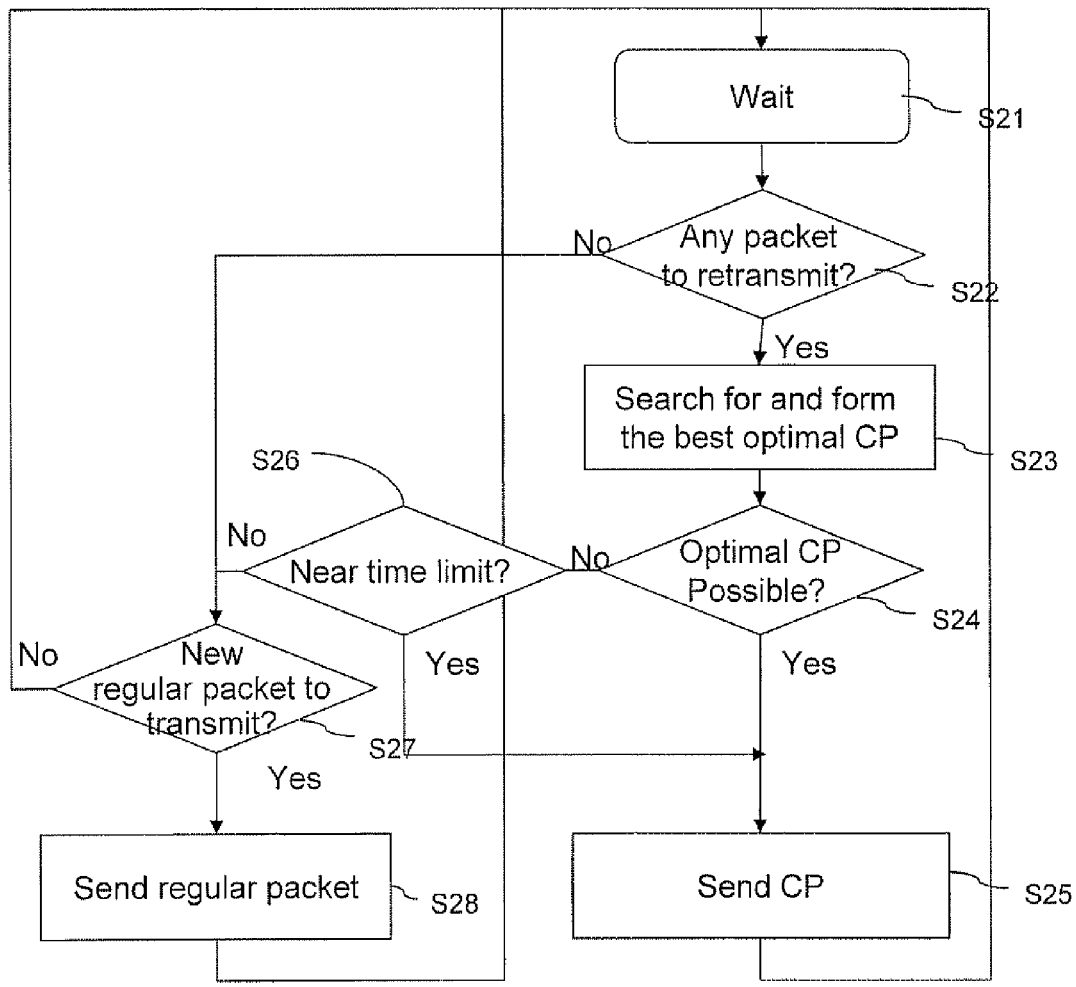
FIG. 10 is a flow chart of a second embodiment of the inventive method.

Two alternative scheduling methods are illustrated in FIGS. 9 and 10, respectively. In FIG. 9, in step S11 the scheduler waits until a scheduling trigger is received. In step S12 the scheduler determines if there are any packets to transmit. If yes, go to step S13; if no, go to step S17.

In step S13 the transmitter searches for and forms the best optimal composite packet, in the manner discussed above.

In step S14 it is determined if an optimal composite packet can be determined. If yes, go to step S15; If no, go to step S17.

Step S15: transmit the optimal composite packet.

Step S17: Is there a new regular packet to transmit? If yes, go to step S18; if no, return to step S11.

Step S18: transmit the regular packet identified in step S17 and return to step S11.

FIG. 10 is similar to FIG. 9 except that it is also considered whether or not one or more regular packets approach a maximum allowed time to live value.

Steps S21-S25 are identical to steps S11-S15 of FIG. 9. If, in FIG. 10, an optimal composite packet cannot be composed in step S24, an additional decision step S26 is performed to determine if one or more regular packets are approaching a maximum time to live value. If so, go to step S28. If not, it is determined in step S27 whether or not there is another regular packet to transmit. In step S28 the appropriate regular packet is transmitted.

Of course, if the answer is no in step S24 or S26 it would also be possible to determine if a composite packet that was not optimal could be formed and transmitted. If this is not the case, or if it is a non-preferred operation, a regular packet may be sent instead. For instance, it may be preferred to send a non-optimal composite packet if two different packets that is possible to form to a composite packet both has their time to live values expiring, whereas the regular packet is sent if only the time limit is reached for a single packet.

It should be noted that in FIGS. 9 and 10 the retransmission of a composite packet is given priority over injecting new packets into the system. Other prioritization algorithms could be used instead, for example, based on a desired relationship between the number of new packets and the number of composite packets that should be transmitted.

Figure 11:
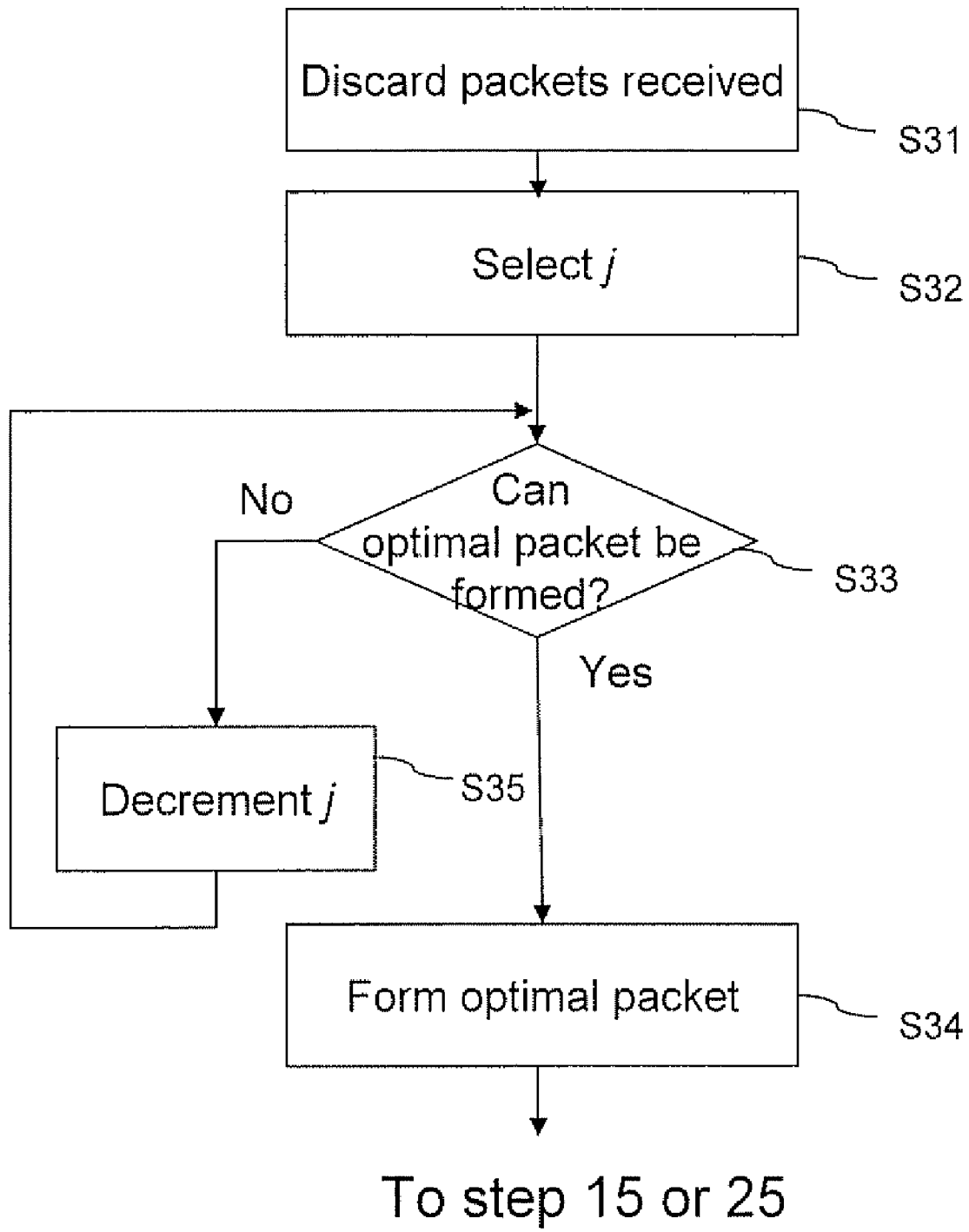
FIG. 11 is a more detailed flow chart of a part of the inventive method.

The preferred scheduling and composite packet encoding algorithm may be performed as substeps to step S4 in the method according to the invention as described with reference to FIG. 3, or to steps S13 and S14 or S23 and S23 of FIGS. 9 and 10, respectively. The method is illustrated in FIG. 11 and comprises the steps of:

Step S31: Identify all entries where the correct receiver has received its designated packet. Discard those entries, as the goal of transmitting a designated packet to the desired node is already fulfilled (i.e. purge already received packet from the buffer for the receiver). The remaining entries can now be used in the joint encoding.

Step S32: The sender selects a level j, thereby considering an optimal composite packet aimed for j+1 users. At level j, all packets that reside with j users only are considered. For each level j there are K over j different combinations of sets, where each set has one or more packets concurrently residing with j users. The mathematical expression for K over j is $$\binom{K}{j} = \frac{K!}{(K-j)!j!}.$$

Preferably, the initial value of j=K−1, where K is the total number of users.

Step S33: Can an optimal composite packet be formed on level j? To form an optimal composite packet one packet must be selected from each of j such sets. If yes, go to step S34; if no, go to step S35.

Step S34: Select one packet from each of the j sets and form the packet by encoding as discussed above. Go to step S5, S15 or S25 of FIG. 3, 9 or 10, respectively, to send the optimal packet.

Step S35: decrement j and go to step S33.

Opportunistic Scheduling

In addition to the joint encoding and scheduling described above, the scheduling decision can also include Channel Quality Indication (CQI) information for even further improved performance.

Using CQI is known in prior art scheduling, where it is often denoted opportunistic scheduling. The CQI is a measure fed back from a receiving node to a sending node, indicating estimated (and sometimes predicted) link quality for the forthcoming transmission instance(s). Based on the CQI measure, and potentially other criteria, the sending node, in traditional opportunistic scheduling, selects a data packet and sends it at a (estimated/predicted) peak opportunity. Such a peak opportunity generally occurs when the instant channel quality exceeds its average quality, e.g. due to that the channel fades up and/or that the interference is absent or the dominating interfering channel fades down. Since the channel varies with time due to mobility and fluctuating traffic, the CQI need to be updated regularly. Opportunistic scheduling is known to enhance throughput through an effect that is commonly known as multiuser diversity.

According to this aspect of the invention, opportunistic scheduling and joint scheduling and coding are jointly performed through integrating both functions. In multihop networks, one may also want to include the routing cost progress of each packet towards the destination, i.e. disregarding whether opportunistic scheduling is used or not.

Importantly, there are certain benefits of applying the invention for opportunistic scheduling in that multiple peak opportunities can be selected and exploited. This stands in contrast to prior art that is restricted, due to the lack of possibility to send multiple messages contained in a single packet, to only send one packet and consequently at most utilize only one peak opportunity at a time. FIG. 12 illustrates schematically the embodiment of the invention using multiple peak opportunities in further detail. An Opportunistic Multihop Scheduling and Forwarding case is illustrated, wherein a plurality of multihop nodes 1205, 1210, 1215, 1220 and 1225 are engaged in forwarding data packet (a) and data packet (A) to their respective destinations. Node 1205 is currently acting as the sending node vs. Receiving node $v_a$ 1210 has stored a priori information comprising of data packet (A), receiving node $v_A$ 1215 of data packet (a), receiving node $v_x$ 1220 of data packet (a) and receiving node $v_y$ 1225 of data packet (b). Opportunistic multihop scheduling is utilised by the sending node 1205 in that the two channels offering peak opportunities, the channels to receiving node $v_a$ 1210 and the channel to receiving node $v_A$ 1215, are exploited. Therefore a composite data packet based on data packets (A) and (a) is chosen by the coding and scheduling algorithm, rather than a composite data packet that should be transmitted on the momentarily less favourable channels. The method is not limited to the exemplified use of two links or to two individual data packets.

To exemplify the operation of the invention in a multihop network exploiting the opportunistic scheduling idea, two scheduler based multihop schemes denoted SDF and MDF, as described in the previously mentioned documents, may be considered. Any node overhearing received packet status messages, this is an extension of the acknowledgement scheme found in SDF and MDF to support the invention, uses this information in the scheduling process and sends a packet, either in a traditional manner or jointly encodes multiple packets according to the invention. In particular, CQI values for the links to the different users may be accounted for in the scheduling process.

The method and arrangement according to the invention is applicable in any network where packets may be sent more than one time. This is inherently the case in networks applying ARQ (due to retransmissions) as well as in multihop networks (due to that packets are generally forwarded over multiple hops as well as due to a potential implementation of Unicast ARQ). The invention has been described in a wireless scenario but could equally well be used in other communication scenarios.

The method according to the present invention is preferably implemented by means of program products or program module products comprising the software code means for performing the steps of the method. The program products are preferably executed on a plurality of entities within a network. The program products are distributed and loaded from a computer usable medium, such as a USB memory, a CD, or transmitted over the air, or downloaded from Internet, for example.

While the invention has been described in connection with what is presently considered to be the most practical and preferred embodiments, it is to be understood that the invention is not to be limited to the disclosed embodiments, on the contrary, it is intended to cover various modifications and equivalent arrangements included within the spirit and scope of the appended claims.

What is claimed is:

1. A method of encoding and scheduling data packets in a communication system, the communication system comprising at least a sending node and at least two receiving nodes, and wherein the at least one sending node is arranged to buffer, schedule, encode and transmit regular data packets comprising information designated to at least one intended receiving node, the method characterised by the steps that:
   each receiving node selectively stores received data packets for which it is not the intended receiving node as a priori information and feeds back information about the a priori information to the sending node;
   the at least one sending node utilizes the information about the a priori information received from at least two of the receiving nodes to form and to transmit an optimal composite data packet to at least two receiving nodes, said optimal composite data packet comprising information designated to at least two receiving nodes and encoded in such a way that the intended receiving node for each of the at least two regular packets can decode the composite packet to obtain information for which it was the intended receiving node; and,
   the sending node transmits the optimal composite packet;
   wherein the step of forming and transmitting an optimal composite packet includes:
      identifying in the sending node which packets have been received by which users;
      dividing packets that were not received by their intended recipient into subsets depending on which user or users they have been received by and which user they were intended for;
      selecting a level j to consider, where $1 \leq j < K$ and level j denotes a set of all packets that have been received by exactly j users, and K is the number of receiving nodes;
      selecting at least j+1 subsets of the set, each subset comprising packets received by a first group, comprising at least one receiving node and intended for a second group, comprising at least one receiving node;
      selecting a packet from each of the j+1 subsets; and,
      if an optimal composite packet can be formed on level j, that is, a packet of one packet from each of the j+1 different subsets, forming and transmitting the optimal composite packet.

2. The method according to claim 1, further comprising the steps of:
   transmitting any data packet as a regular packet the first time it is transmitted; and,
   when a packet is to be retransmitted, determining if it can be used in the optimal composite packet.

3. The method according to claim 1, further comprising the step of, if an optimal composite packet cannot be formed on level j, selecting a new value for j.

4. The method according to claim 1, further comprising the step of, if an optimal composite packet cannot be formed on level j, considering whether a non-optimal composite packet can be formed on level j.

5. The method according to claim 1, further comprising the step of forming a non-optimal composite packet if at least one packet in at least one subset is approaching a maximum time to live.

6. The method according to claim 1, further comprising the step of, if an optimal packet cannot be formed on level j and if a regular packet is approaching a maximum time to live, transmitting the regular packet.

7. The method according to claim 1, further comprising the step of, in the receiving node:
   receiving the composite data packet and decoding the composite data packet using a priori information stored in the receiving node.

8. The method according to claim 1, wherein in the forming step, the sending node forms the composite data packet by joint encoding and scheduling of at least two data packets.

9. The method according to claim 8, wherein XOR-operations are utilized in the joint encoding.

10. The method according to claim 8, wherein modulus-operations are utilized in the joint encoding.

11. The method according to claim 8, wherein in the joint encoding and scheduling an optimization is performed considering different combinations of packets and different combinations of receivers and knowledge of their stored a priori information.

12. The method according to claim 11, wherein optimization supplementary information is used in addition to the a priori information.

13. The method according to claim 12, wherein the supplementary information comprises at least one of the parameters: Quality of Service requirements, Channel Quality Indication, routing costs, and data packet characteristics.

14. The method according to claim 1, wherein the number of bits used for the composite data packet is shorter than the sum of the number of bits of the two regular data packets.

15. The method according to claim 1, wherein the communication system is a cellular system and the first sending node is a base station.

16. The method according to claim 1, wherein the communication system is a multihop system.

17. A method of jointly encoding and scheduling multiple data packets in a sending node in a communication system wherein the sending node is in communication with K receiving nodes, where K>1 and the sending node is arranged to buffer, schedule, encode and transmit regular data packets to at least one intended receiving node, the method comprising the steps of:
   receiving feedback from at least two of the receiving nodes related to regular data packets received by the at least two receiving nodes, said feedback comprising information on at least one regular data packet received and stored as a priori information by one of the at least two receiving nodes, which was not the intended receiving node for the received regular data packet; and, using the feedback, selecting and encoding at least two data packets in such a way that the intended receiving node for each of the at least two regular packets can decode a composite packet to obtain information for which it was the intended receiving node;

wherein the step of selecting and encoding at least two data packets includes:

identifying in the sending node which packets have been received by which users;

dividing packets that were not received by their intended recipient into subsets depending on which user or users they have been received by and which user they were intended for;

selecting a level j to consider, where $1 \leq j \leq K$ and level j denotes a set of all packets which have been received by exactly j users;

defining at least j+1 subsets of the set, each subset comprising packets received by a first group comprising at least one receiving node and intended for a second group comprising at least one receiving node;

identifying packets that are stored in j+1 subsets; and if an optimal composite packet can be formed on level j, that is, a packet of j+1 packets from j+1 different subsets, forming and transmitting the optimal composite packet.

18. The method according to claim 17, further comprising the steps of:

transmitting any data packet as a regular data packet the first time it is transmitted; and, when a packet is to be retransmitted, determining if it can be used in the optimal composite packet.

19. The method according to claim 17, further comprising the steps of:

the sending node monitoring if any feedback messages have been received; and, the sending node determining if the feedback is feedback on a priori information from a receiving node or if it is feedback on received own data, and if on own data, the sending node proceeds with regular ARQ operations, and if on a priori a priori information, the sending node stores information from the feedback in an a priori information buffer, and returns to the monitoring step.

20. The method according to claim 19, wherein in the forming steps, the sending node forms the composite data packet by joint encoding and scheduling of at least two data packets.

21. The method according to claim 20, wherein XOR-operations are utilized in the joint encoding.

22. The method according to claim 20, wherein modulus-operations are utilized in the joint encoding.

23. The method according to claim 20, wherein in the joint encoding and scheduling an optimization is performed considering different combinations of packets and different combinations of receivers and knowledge of their stored a priori information.

24. The method according to claim 23, wherein in optimization supplementary information is used in addition to the a priori information.

25. The method according to claim 24, wherein the supplementary information comprises at least one of the parameters: Quality of Service requirements, Channel Quality Indication, routing costs, and data packet characteristics.

26. The method according to claim 17, wherein the number of bits used for the composite data packet is shorter than the sum of the number of bits of the data packets it is based on.

27. A sending node in a communication system, wherein the sending node is in communication with K receiving nodes, where K>1, by transmitting information in the form of regular data packets, each packet being intended for one receiving node, said sending node comprising:

a feedback receiver adapted to receive and identify a priori information in feedback from receiving nodes;

an a priori information storage module for storing a priori information from a plurality of receiving nodes, comprising information about at least one data packet received by a receiving node that was not the intended receiver for this data packet, the a priori information storage module connected to said feedback receiver; and, a joint coding and scheduling module for forming a composite data packet from at least two regular data packets, wherein the joint coding and scheduling module utilizes a priori information from the a priori information storage module to determine which multiple individual data packets to retrieve from a buffer module for use in the composite data packet, characterized in that the joint coding and scheduling module is arranged to form the optimal composite data packet based on at least two packets having different intended receiving nodes, in such a way that the intended receiving node for each of the at least two regular packets can decode the composite packet to obtain information for which it was the intended receiving nodes;

wherein the joint coding and scheduling means is arranged to schedule packets according to the following:

identifying which packets have been received by which users;

dividing packets that were not received by their intended recipient into subsets depending on which user or users they have been received by and which user they were intended for;

selecting a level j to consider, where $1<j<K$ and level j denotes a set of all packets which have been received by exactly j users:

defining at least j+1 subsets to the set, each subset comprising packets received by a first group comprising at least one receiving node and intended for a second group comprising at least one receiving node;

identifying packets that are stored in j+1 subsets; and, if an optimal composite packet can be formed on level j, that is, a packet of one packet from each of the j+1 different subsets, forming and transmitting the optimal composite packet.

28. The sending node according to claim 27, wherein the joint coding and scheduling module is arranged to schedule any data packet to be transmitted as a regular data packet the first time it is transmitted, and, when a packet is to be retransmitted, to determine if it can be used in the optimal composite packet.

29. The sending node according to claim 27, further comprising a supplementary information module in connection with the joint coding and scheduling module, said supplementary information module for storing supplementary channel information and for providing the joint coding and scheduling module with supplementary channel information.

30. The sending node according to claim 29, wherein the supplementary information module is arranged to store at least one of the parameters: Quality of Service requirements, Channel Quality Indication, routing costs, and data packet characteristics.

31. The sending node according to claim 30, wherein the joint coding and scheduling module is arranged to perform the scheduling and encoding based on information provided both from the a priori information storage module and the supplementary information module.

* * * * *